May 26, 1964     A. DEMINGER ETAL     3,134,399

MULTIPLE RING VALVE

Filed Dec. 28, 1962

Inventors:
Alois Deminger
Robert Pöhler

Assignee:
HOERBIGER VENTILWERKE A.G.

United States Patent Office 3,134,399
Patented May 26, 1964

3,134,399
MULTIPLE RING VALVE
Alois Deminger, Vienna, Austria, and Robert Kohler, Schongau (Lech), Upper Bavaria, Germany, assignors to Hoerbiger Ventilwerke Aktiengesellschaft, Vienna, Austria
Filed Dec. 28, 1962, Ser. No. 250,456
2 Claims. (Cl. 137—512.1)

The present invention relates to automatic ring valves, widely used especially in piston compressors, the closure means of which consisting of slotted plates formed by connected concentric rings, or consisting of single rings that are movable independently from one another.

As is generally known automatic valves are expected to release large passage areas in the open position, thus reducing pressure drops under otherwise equal circumstances as much as possible. On the other hand valves are required to provide a perfect seal. For this purpose the contact surfaces of the valve seats and valve plates have to be closely pressed against each other. This tightening results chiefly from the pressure differential arising in the valve when closed, whereas the original spring load, the weight of the valve plate itself and other causes are of minor importance. The specific sealing pressure may be considerably influenced by altering the width of the sealing borders on which the closure means rest on the valve seat when the valve is closed. In doing so compromises are inevitable:

Narrow sealing borders provide a tight fit in addition to low pressure losses because larger channel sections can be provided in the valve seat. Wider sealing borders, on the contrary, facilitate the manufacture and reduce the cost and maintenance of the valves, and diminish the prevailing stresses and wear as well as their consequences. In most cases the width of the sealing borders is dimensioned on the basis of specific pressures considered admissible, which, of course, are dependent on the materials used for seats and plates and possibly on the number of revolutions of the compressor, its working pressures and other service data. The width thus determined on the basis of these considerations was then applied to all the sealing borders of a valve. This is especially easily recognizable when the valve seat is machined on the lathe so as to provide salient borders as is usually the case.

This customary way of dimensioning the width of the sealing borders is, however, by no means the most favourable one, because a further practical experience was not taken into account. It is the fact of multiple ring valves suffering breakages nearly always in the outer rings from which empirical result it may be gathered that the stresses in these spots—caused for example by non parallel beating of the valve plate against the seat—are more violent than those encountered in the inner rings.

It is the object of the present invention to provide automatic ring valves in which the life of the valve seats and closure means is increased and/or in which the pressure drops on flowing through are reduced.

Accordingly, the invention provides for making the sealing borders not with the same uniform width but with a varied width in such a way that with each closure means the outermost sealing border between valve seat and closure means is wider than the inner sealing border or borders that are dimensioned as narrow as possible. The suggested measure may be made of in two regards: for increasing the life of the valve seat and closure means the outer sealing borders will be widened at the expense of the inner sealing borders. In order to lessen the flow pressure losses, however, it is proposed, in case of a satisfactory life, to utilize the spare parts available in the area of the inner sealing borders for the widening of the passage ports of the seat, or even for providing an additional annular port in the valve seat in the case of several such ring channels. It is obvious that the reduction of the pressure drops obtained in this way are not unimportant. If, for example, the sealing borders of the inner channels are narrowed by 0.5 mm. each the enlargement of the passage area, at a channel width of say 4 mm., of the inner channels will amount to 25 percent, for the whole valve, subsequently, to 10 to 20 percent. As the pressure losses rise approximately in a square proportion with the fluid velocity, in those cases where valve plate lifts may also be increased correspondingly, losses can be reduced by up to approximately 35 percent. But also with valve lifts unchanged pressure drop reductions up to 20 percent are obtainable.

Further features and advantages of the invention are apparent from the following detailed description of several embodiments of the invention shown by way of example in the accompanying drawings, in which.

Figure 1:
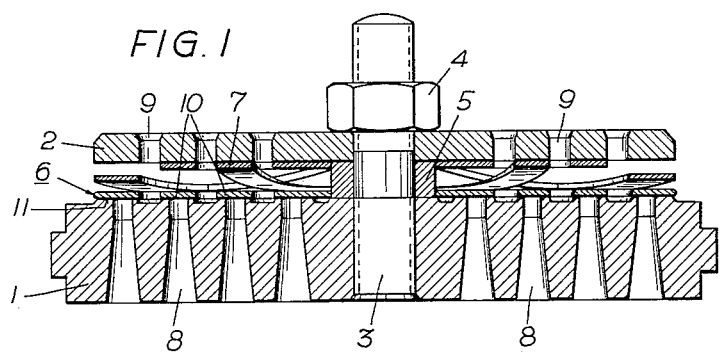
FIG. 1 is an axial section through the valve.

The ring valve according to FIG. 1 consists of a valve seat 1 and of a valve guard 2 interconnected by means of the bolt 3 and the screw nut 4. Between the valve seat 1 and the valve guard 2 an annular washer 5 is inserted by which the guard 2 is spaced from the valve seat 1 and which washer serves at the same time as a guidance of the closure means 6 arranged in the clearance between the valve seat 1 and the valve guard 2. Furthermore, in this embodiment a spring plate 7 is inserted in the clearance between valve seat 1 and guard 2 serving as a closing load. In the valve seat 1 annular passage ports 8 and in the guard 2 the corresponding passage ports 9 are provided. According to this embdoiment the closure means 6 consists of four concentric rings 10 covering the passage ports 8 in the valve seat 1 when the valve is closed. In this position the rings 10 rest on the seat 1 along the sealing borders 11.

Figure 2:
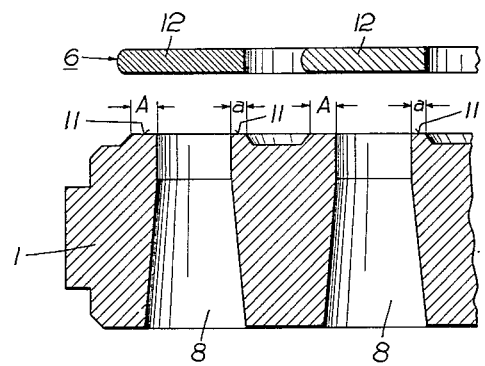
FIG. 2 is a schematical magnified view of a part thereof.

In the schematic view of the embodiment as per FIG. 2 the valve seat 1 of which is shown only the outer part with two passage ports, is likewise provided with protruding sealing borders 11 machined in a simple and cheap manner on a turning lathe. The valve is shown in an open position when the closure means 6 are lifted at some distance from the valve seat 1. In this embodiment the closure means are made up of separate disconnected individual rings 12 where with each ring 12 the width A of the outer sealing border 11 is wider than the width $a$ of the inner sealing border 11 of the same ring 12. The valve components which have no bearing on the invention, such as guards, spring means, cushion or damping plates, if any, etc., are not shown on the drawing in the interest of clearness. The limitations of the passage ports 8 in valve seat 1 are drawn cornered, just as they may result from the milling or punching process.

Figure 3:
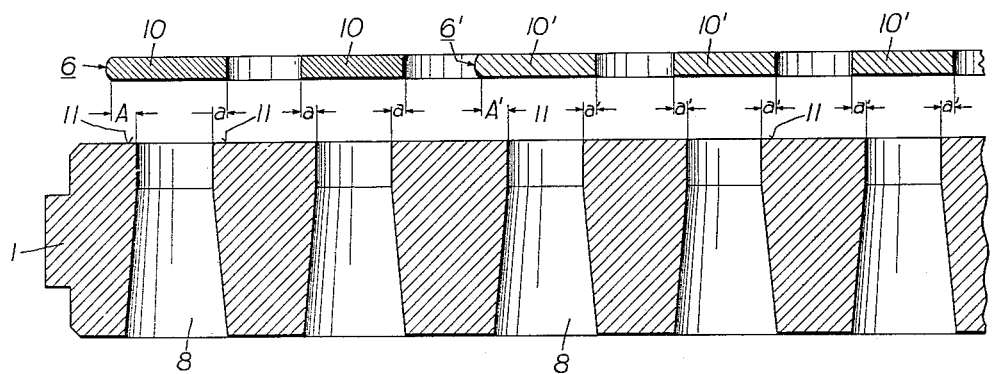
FIG. 3 is a schematical, likewise magnified, view of another embodiment of the invention.

The further embodiment of the invention as per FIG. 3 is distinguished from that according to FIG. 2 chiefly by being provided with two separate, disconnected, integral slotted plates 6 and 6' serving as closure means and consisting each of concentric rings 10 and 10', which rings 10, 10' cover or uncover one passage channel 8 each in valve seat 1.

The rings 10, 10' contact the valve seat 1 along the sealing borders 11 which, however, are not especially machined by turning, but are made up of those portions of the smooth surface of the valve seat 1 which are overlapped, when the valve is closed, by the rings 10, 10' on both sides of the passage ports 8. As it is fully evident from FIG. 3 in every case the width A, A' of the outer sealing borders 11 of the outermost rings 10, 10' of every slotted plate 6, 6' is wider than the width a, a' of the rest of the sealing borders. In this figure as well the valve components irrelevant to the nature of the invention were omitted.

We claim:

1. A multiple ring valve comprising a valve seat, annular passage ports in said valve seat, a valve guard located at some distance from the valve seat, closure means inserted between the valve seat and the valve guard and consisting of concentric rings, sealing borders provided sidewise at the passage ports, along which sealing borders the rings of the closure means are in touch with the valve seat when the valve is closed, wherein the concentric rings of the closure means form separate disconnected single rings, and with each ring the outer sealing border is wider than the inner one.

2. A multiple ring valve comprising a valve seat, annular passage ports in said valve seat, a valve guard located at some distance from the valve seat, closure means inserted between the valve seat and the valve guard and consisting of concentric rings, sealing borders provided sidewise at the passage ports, along which sealing borders the rings of the closeure means are in touch with the valve seat when the valve is closed, wherein the rings of the closure means are connected to form at least two concentric separate integral slotted plates, and the outer sealing border of the outermost ring of each slotted plate is wider than each of the rest of sealing borders of the slotted plate.

References Cited in the file of this patent
UNITED STATES PATENTS
1,222,321   Peters _____ Apr. 10, 1917